(12) United States Patent
Holderman

(10) Patent No.: US 8,196,339 B1
(45) Date of Patent: Jun. 12, 2012

(54) RODENT TRAP

(76) Inventor: Dale F. Holderman, Santa Cruz, CA (US)

(*) Notice: Subject to any disclaimer, the term of this patent is extended or adjusted under 35 U.S.C. 154(b) by 0 days.

(21) Appl. No.: 12/986,023

(22) Filed: Jan. 6, 2011

Related U.S. Application Data

(63) Continuation-in-part of application No. 12/953,185, filed on Nov. 23, 2010, now abandoned.

(51) Int. Cl.
*A01M 23/24* (2006.01)
*A01M 23/26* (2006.01)

(52) U.S. Cl. ............ 43/92; 43/88; 43/94; 43/91

(58) Field of Classification Search ............. 43/88–95; A01M 23/24, 23/26
See application file for complete search history.

(56) References Cited

U.S. PATENT DOCUMENTS

| | | | | |
|---|---|---|---|---|
| 1,580,583 | A * | 4/1926 | Catlin | 43/85 |
| 3,529,377 | A * | 9/1970 | Anderson | 43/91 |
| 4,161,842 | A * | 7/1979 | Jacob | 43/85 |
| 4,549,368 | A * | 10/1985 | Bustle | 43/88 |
| 4,733,494 | A * | 3/1988 | Johnson et al. | 43/85 |
| 4,765,087 | A * | 8/1988 | Holtgrefe, Sr. | 43/94 |
| 2007/0163167 | A1 * | 7/2007 | Albano | 43/88 |

* cited by examiner

*Primary Examiner* — Darren W. Ark
*Assistant Examiner* — Thien Thanh Pham
(74) *Attorney, Agent, or Firm* — Law Offices of Thomas E. Schatzel, A Prof. Corp.

(57) ABSTRACT

A rodent trap comprises a stiff U-shaped spring with long outstretched arms and wire half-noose that are normally closed tightly together. A folding spreader mechanism at the base of the U-shaped spring holds the long outstretched arms apart until a trigger allows the spreader to fold up. The folding spreader mechanism is prevented from extending over-center and locking like a knee joint as near the point of going over-center, a tiny force like a trigger keeps the folding spreader mechanism extended even against strong spring pressures.

16 Claims, 7 Drawing Sheets

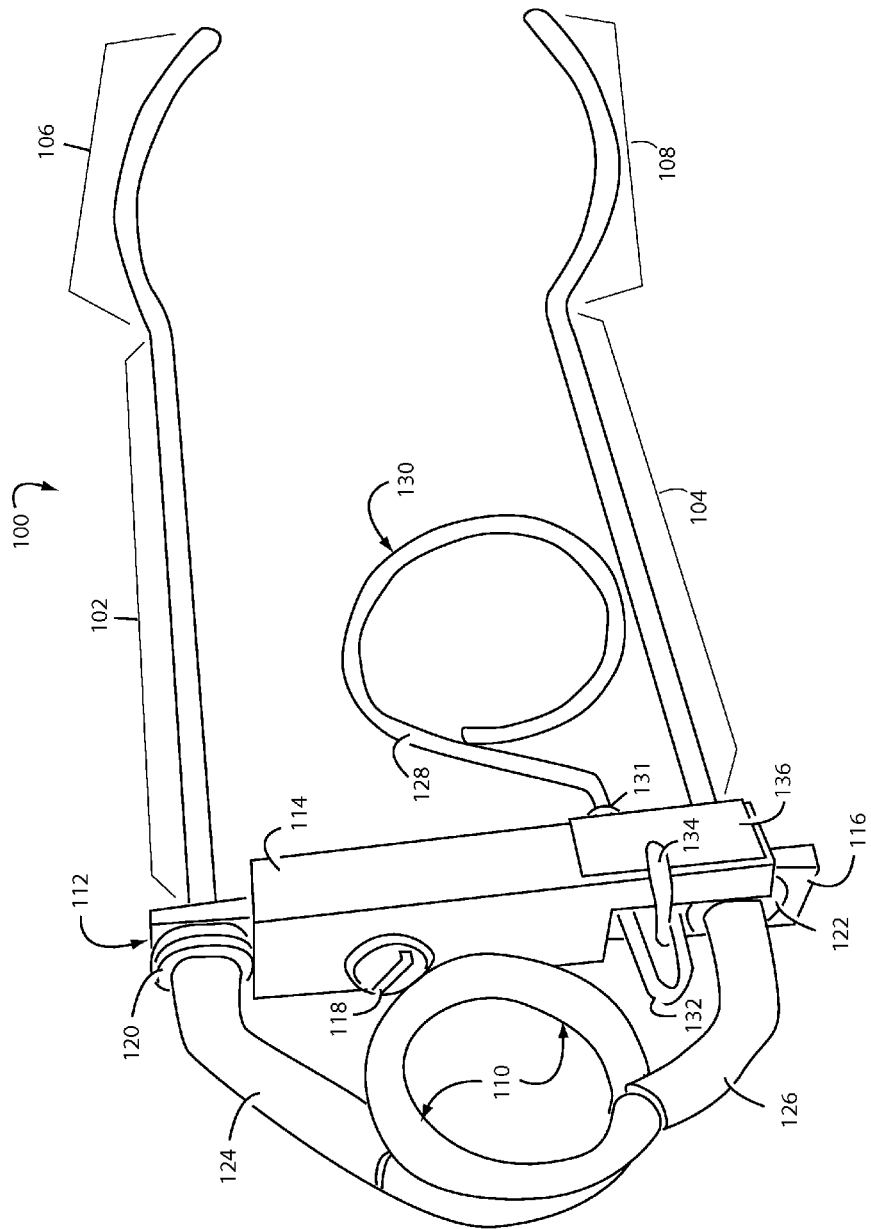

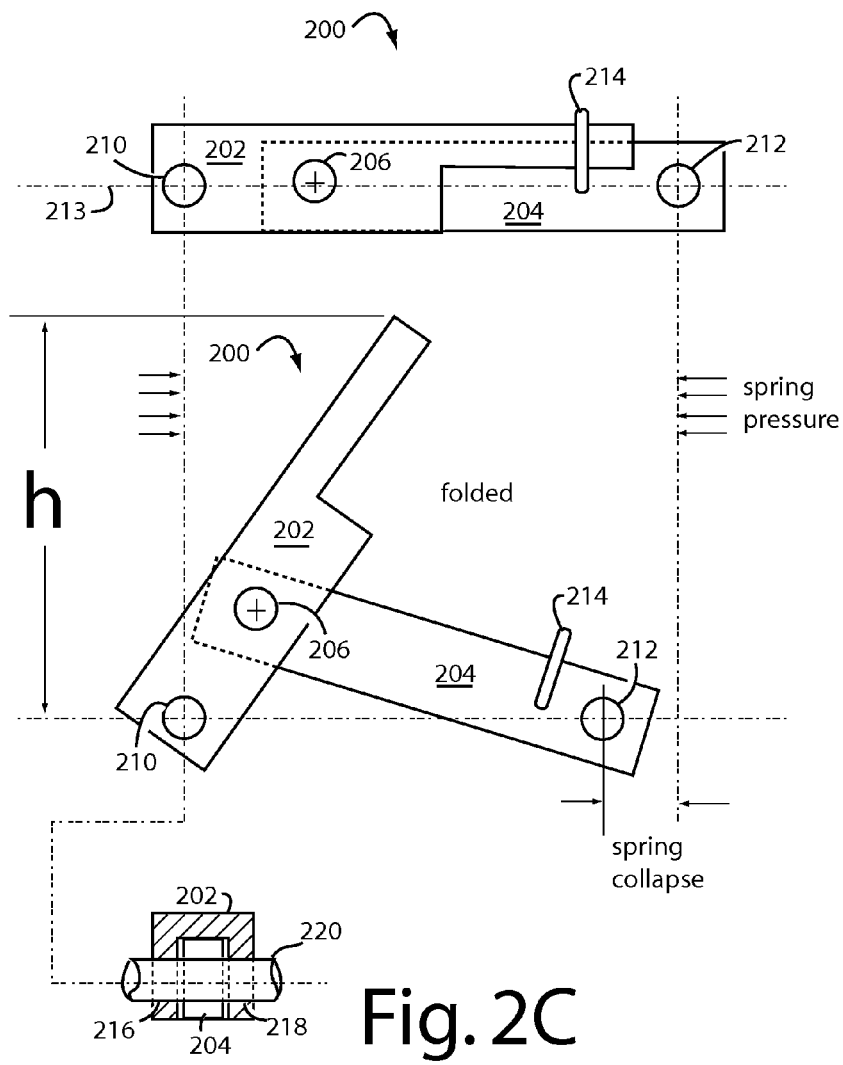

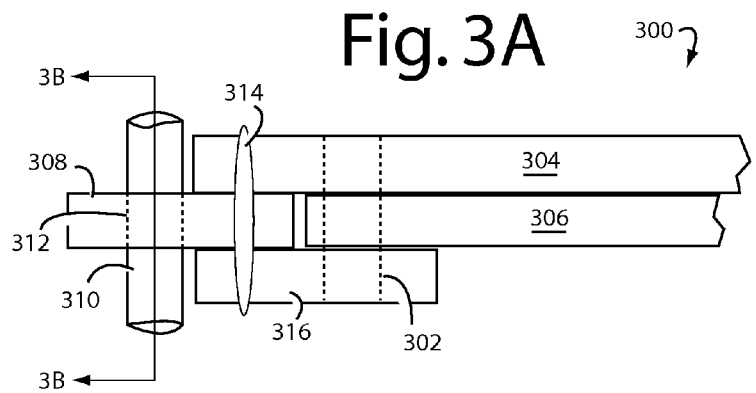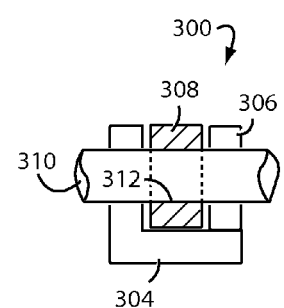
Fig. 3A
Fig. 3B
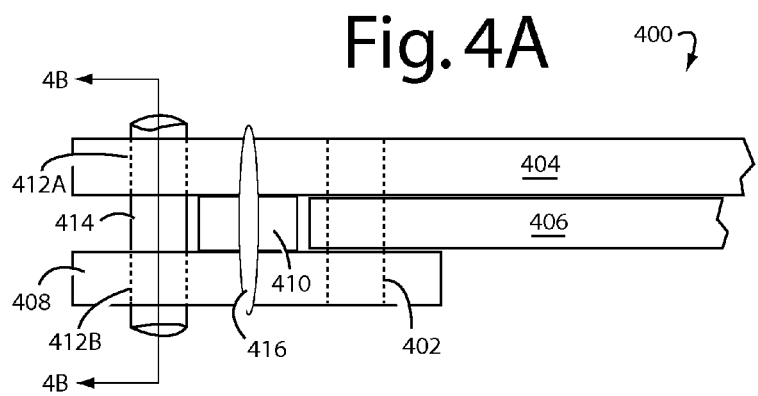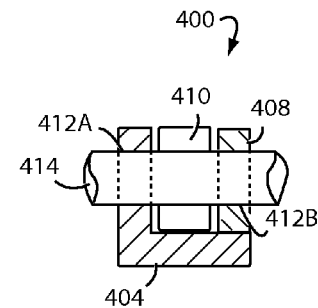
Fig. 4A
Fig. 4B

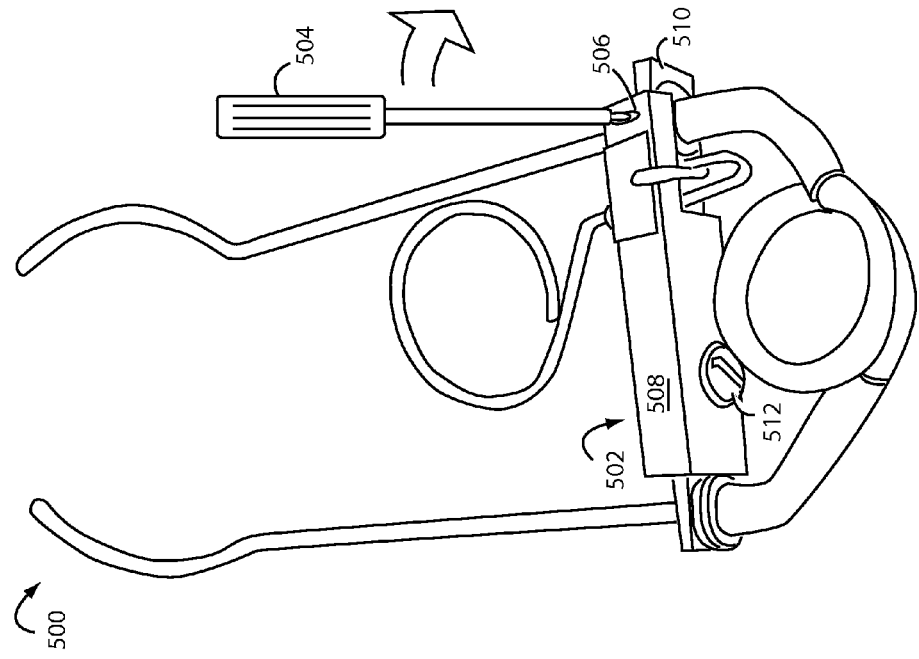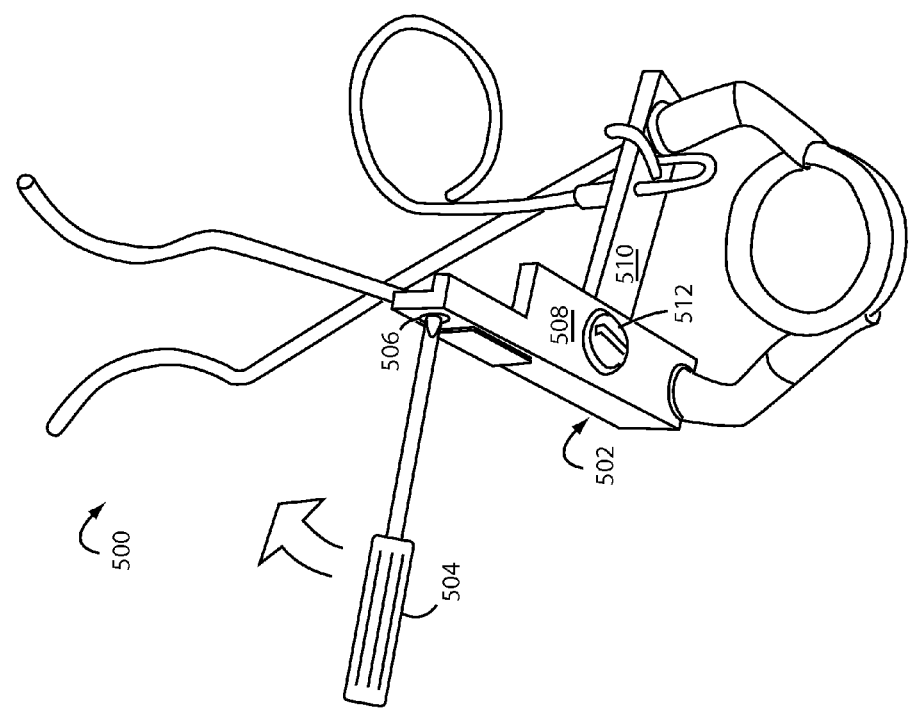

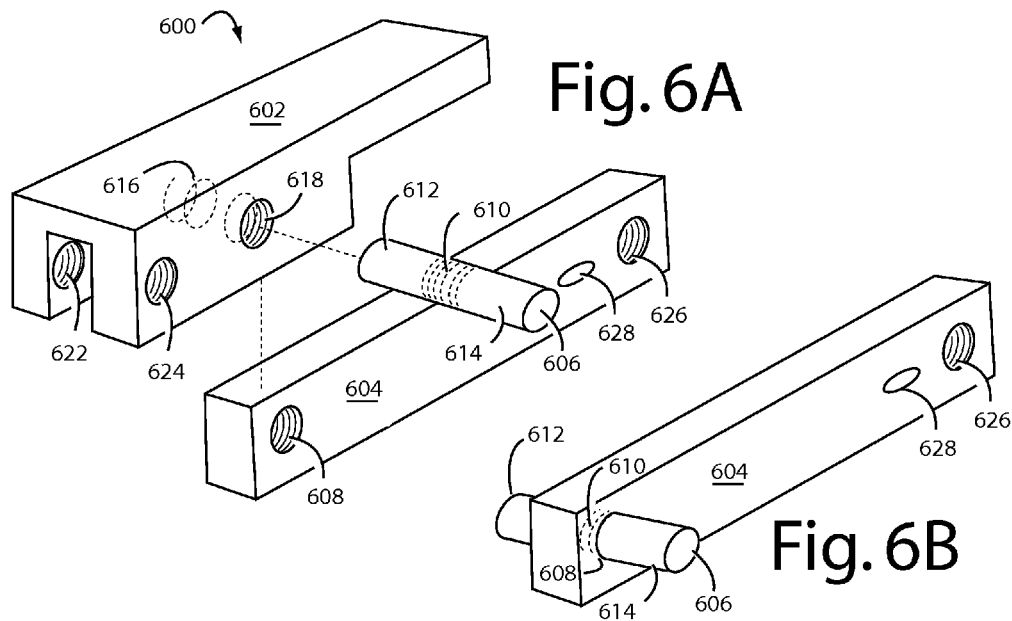
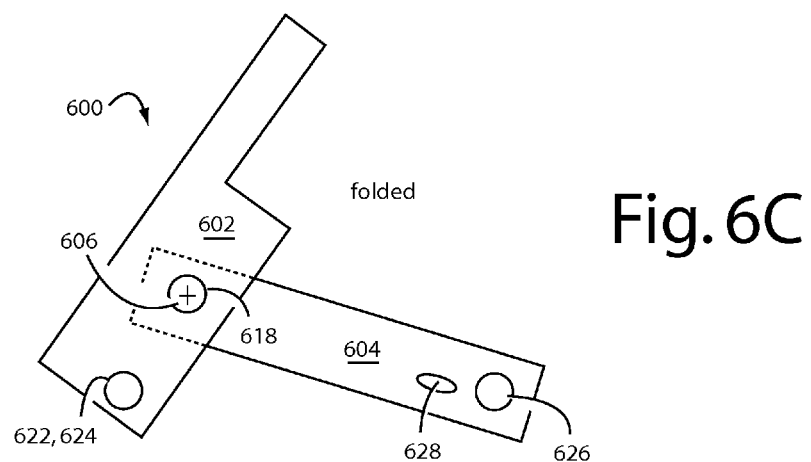

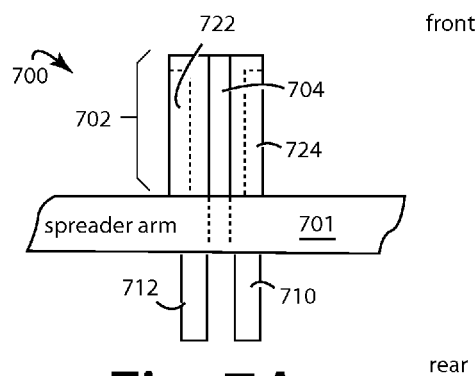
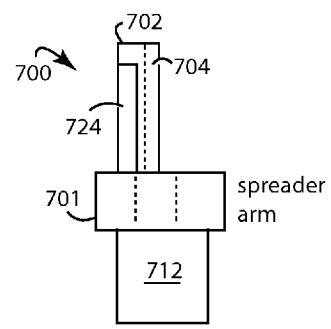
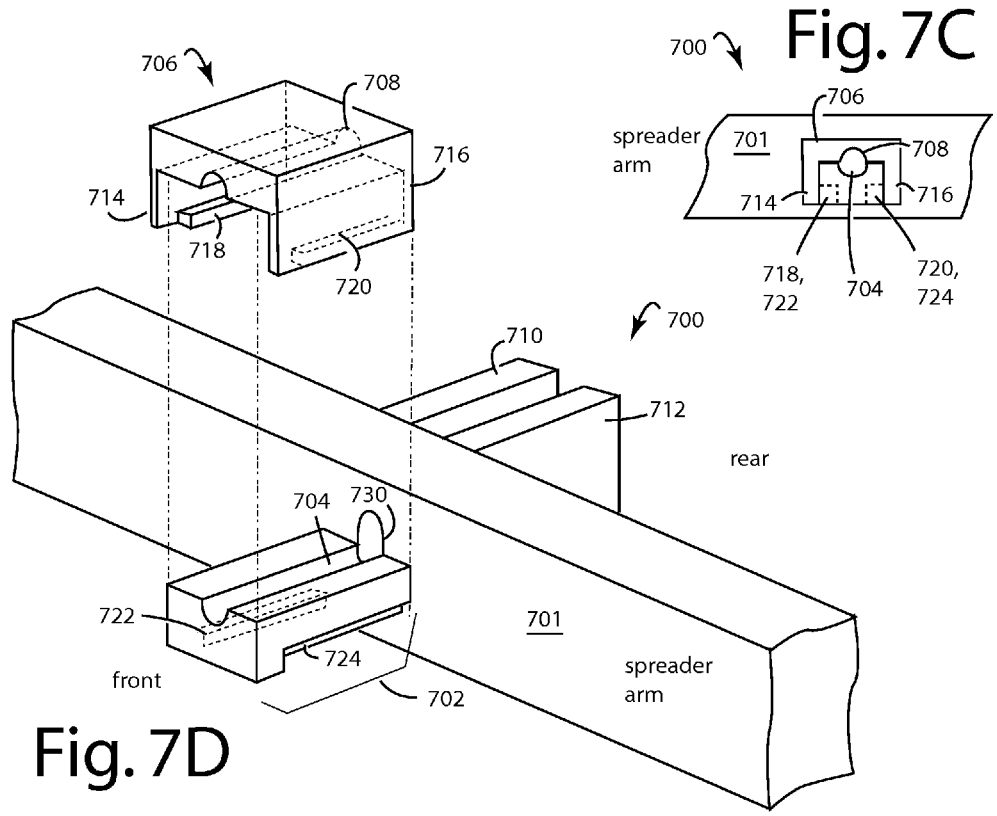

RODENT TRAP

COPENDING APPLICATION

This application is a continuation-in-part of U.S. patent application titled RODENT TRAP, Ser. No. 12/953,185, filed Nov. 23, 2010, now abandoned by Dale F. Holderman.

BACKGROUND OF THE INVENTION

1. Field of the Invention

The present invention generally relates to rodent traps with folding spreader mechanisms and spring triggers, and in particular to traps with devices and methods for reducing friction in their operation by maintaining proper alignments of the component parts.

2. Description of the Prior Art

There is a wide variety of rodent and especially gopher traps that have been marketed and patented over the years. Many of the rodent traps are not very effective because they require the rodent to climb over parts of the mechanisms in order to reach a triggering device. And many of these triggers are not very sensitive and require significant force.

Fundamentally, gopher traps must fit into an ordinary sized gopher hole and be able to operate effectively within the confines of that hole. Traps that depend on arms closing down on the gopher when the trap is triggered must also apply enough force to kill the gopher rather than merely hold onto it. The triggers should be very sensitive, yet stable enough to prevent the trap from triggering prematurely.

When a gopher hole is left open and exposed, any resident gopher can be expected to come investigate and to try to close the hole at the surface with loose dirt. Typical gopher traps are fully inserted into these holes with their capturing arms pointed down into the hole and the hole is left open. It is this investigation behavior that will cause a gopher to come up between a trap's outstretched arms and trigger the spring closure.

One type of common gopher traps use two parallel opposite rotating shafts coupled closely together with rotating jaws at the ends. These are placed down into the gopher hole. The distal ends of each of these shafts have wide open half-nooses that can be triggered to forcefully close on a hinge together to snare and kill the gopher. The problem with these mechanisms is the gopher must crawl over the length of the oppositely rotating shafts, couples, and supporting mechanisms, to reach the trigger.

A better, but still conventional type of gopher trap is like that described by Oscar Johnson, et al., in U.S. Pat. No. 4,733,494, issued Mar. 29, 1988. A pair of elongated rods with jaws on the ends are biased closed together by a coil spring. A folding, over-center toggle trip mechanism is slipped on the rods between the coil spring and the jaws to lock them open. A trigger levers the over-center toggle trip mechanism past its over-center point, and spring pressure does the rest to fold up the toggle so the jaws can snap closed. The problem with this arrangement is caused by the toggle trip mechanism locking over center, too much pressure is needed on the trigger to activate the trap.

What is needed is an improved folding spreader mechanism for a trap with a trigger mechanism that does not go over-center and is sensitive to slight touches on the trigger.

SUMMARY OF THE INVENTION

Briefly, a rodent trap embodiment of the present invention comprises a folding spreader mechanism that holds open a stiff U-shaped spring with long outstretched arms ending in wire half-noose jaws that will forcefully close tightly together when the mechanism is triggered to collapse. A folding spreader mechanism at the base of the U-shaped spring holds the long outstretched arms apart until a trigger allows its two arms to fold up on a pivot. The folding spreader mechanism is prevented from extending over-center and locking like a knee joint, and the pivot is constructed to eliminate squirming and misalignments from wiggling. Near the point of going over-center, only a tiny force supplied a trigger is necessary to keep the folding spreader mechanism extended against even very strong spring pressures.

These and other objects and advantages of the present invention will no doubt become obvious to those of ordinary skill in the art after having read the following detailed description of the preferred embodiments that are illustrated in the various drawing figures.

IN THE DRAWINGS

FIG. 1A is a perspective view diagram of a rodent trap embodiment of the present invention showing the folding spreader mechanism set to keep the wire arms and half-nooses open and ready to spring closed;

FIG. 2A is a side view diagram of a spreader mechanism like that used in FIGS. 1A and 1B, and is shown in the extended, or trap-armed position;

FIG. 2B is a side view diagram of the spreader mechanism of FIG. 2A, and is shown in the folded, or trap-sprung position;

FIG. 2C is a cross-sectional diagram taken along the axis of pivot hole 210 and shows how a yoke can be used to keep spreader mechanism properly aligned with the forces exerted by the two arms trying to close together;

FIGS. 3A and 3B are bottom view and cross-sectional views of a spreader mechanism that employs a yoke type pivot for the middle pivot;

FIGS. 4A and 4B are bottom view and cross-sectional views of a spreader mechanism that employs two yoke type pivots for the middle pivot and an outside pivot on the spring arm;

FIG. 5A is a perspective view diagram of a trap and spreader mechanism like that used in FIGS. 1A and 1B, and is shown in the folded, or trap-sprung position. In particular, a tool is shown inserted into a slot that can provide the user with the extra leverage that may be needed to comfortably set the trap as shown in FIG. 5B;

FIG. 5B is a perspective view diagram of the trap and spreader mechanism of FIG. 5A, and is shown in the extended, or trap-armed position using a tool to make it easier;

Figure 1B:
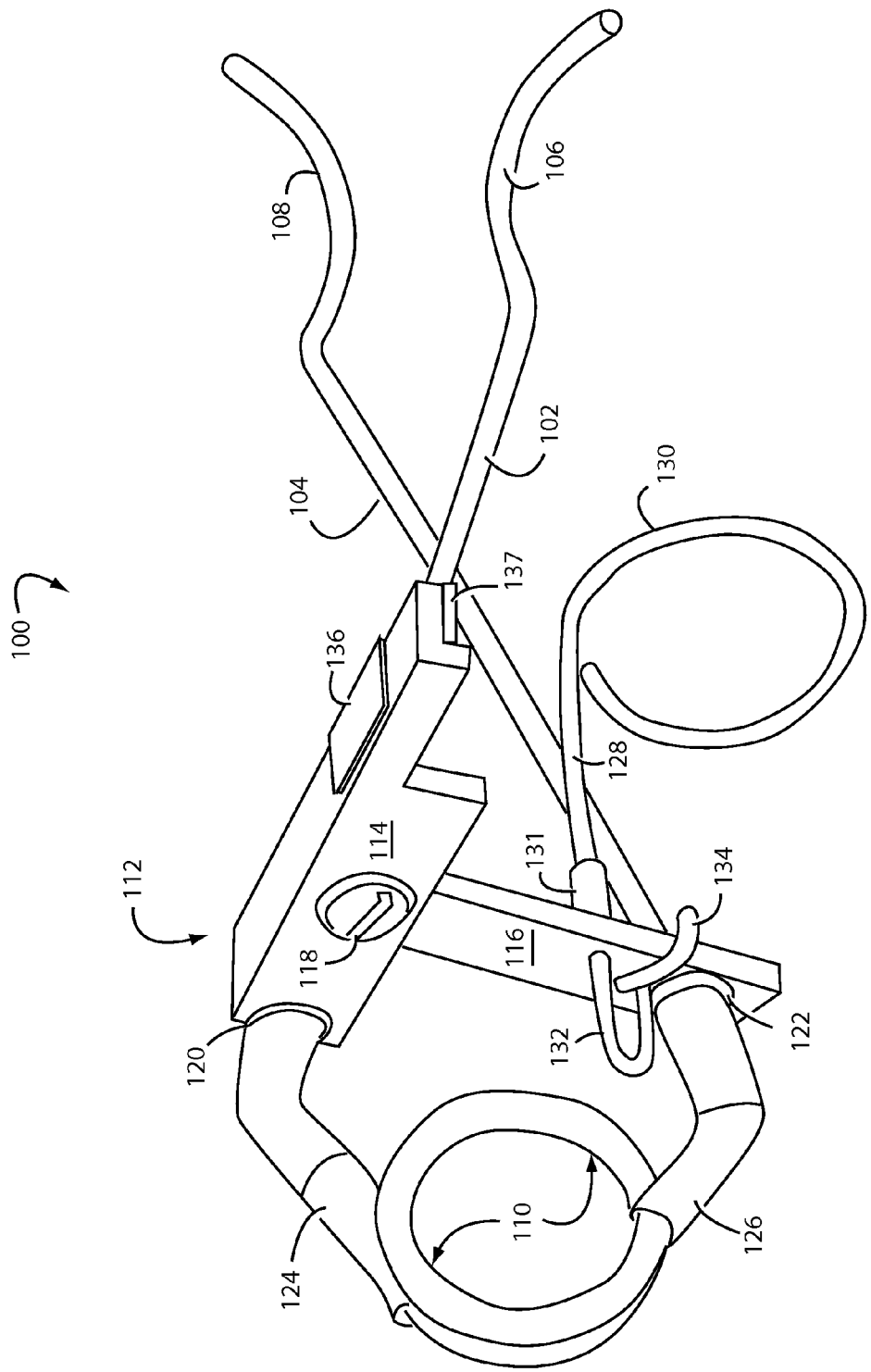
FIG. 1B is a perspective view diagram of the rodent trap of FIG. 1A showing the folding spreader mechanism folded-up allowing the wire arms and half-nooses to close together to trap a rodent.

FIGS. 6A, 6B, and 6C, represent a folding spreader mechanism in a perspective exploded assembly view, a perspective of two of the constituent pieces joined together, and a side view; and FIGS. 7A, 7B, 7C, 7D are top, side, front, and perspective views of a molded trigger guide for use in rodent trap embodiments of the present invention.

DETAILED DESCRIPTION OF THE PREFERRED EMBODIMENT

FIGS. 1A and 1B represents a rodent trap embodiment of the present invention, herein referred to by the general reference numeral 100. The trap can be sized up or down for a targeted rodent. For example, a mid-sized trap for gophers can be down-sized for moles and up-sized if intended for ground squirrels. Rodent trap 100 comprises a pair of elongated rods or outstretched wire arms 102 and 104, and each are finished at their distal ends with jaws, e.g., a half-noose 106 and 108. The pair of open half-nooses 106 and 108 are each perpendicularly attached to the distal ends of the arms 102 and 104, and their operation is such that they remain parallel to one another as the arms are forced apart and released to close together.

A very stiff spring 110 works to close the arms 102, 104, and half-nooses 106, 108, tightly together, e.g., to kill a small rodent or gopher trapped between. A spreader mechanism 112 has two basic parts 114 and 116 that can fold together around a fastener 118. The outside ends of spreader mechanism parts 114 and 116 each have holes that slip over wire arms 102 and 104. These may further include bushings 120 and 122 to reduce wear and reduce any looseness in operation.

The relative placement of fastener 118 with regard to the pivot joints formed by slipping spreader mechanism parts 114 and 116 over wire arms 102 and 104 is critical. It is important that the two spreader mechanism parts 114 and 116 that fold together not be allowed to go "over-center" and find a place where they can lock. Shims or tabs can be inserted to guarantee this, as well as can precision machining of the parts. FIGS. 2A and 2B illustrate this point in more detail.

Pieces of tubing 124 and 126, such as heat shrink tubing or surgical tubing, are slipped over the wire arms 102 and 104 between spring 110 and spreader mechanism 112 to keep the spreader mechanism 112 properly positioned. Other devices with a similar purpose can be used. For example, stops can be formed to properly position spreader mechanism 112 on the wire arms 102 and 104 by bending or deforming the wire of the arms, or by placing retainers of various sorts on the wire arms, perhaps using a pressure fit, spot welding, soldering, brazing or gluing retainers in place.

A trigger arm 128 and a trigger ring 130 formed in a loop are used to sense the nose of the gopher trying to push through the trap 100. From the trigger ring 130, the trigger arm 128 extends through a front trigger guide 131, through the spreader mechanism arm 116, looping through a rear trigger guide 132 and over the top of spreader mechanism arm 114 to create a catch 134. The catch 134 can ride directly on mechanism arm 114 itself or on a Teflon pad 136. A shim 137 is used to keep the spreader mechanism arms from going past center.

The front trigger guide 131 can simply be a round tube. The rear trigger guide 132 is configured to keep the wire trigger arm upright and prevent it from rotating around its long axis. A loop of wire or a notched plate can work well for this purpose.

Alternatively, trigger ring 130 can instead comprise a flat plate or other form that would be easy to construct and that would be effective in sensing the touch of a rodent.

Trigger arm 128 can alternatively be made with flat stock instead of round wire. In that case, the front trigger guide 131 would be a matching rectangular tube. No rear trigger guide 132 would be needed, since a flat trigger arm in a rectangular tube would not be able to rotate around its long axis.

Catch 134 keeps the spreader mechanism parts 114 and 116 from folding up by applying a very light, but sufficient locking force. A slight touch on the trigger ring 130 pushes on trigger arm 128 and moves catch 134 off of the spreader arm 114 allowing the already under-center joint to fold, closing the half-noose jaws. This is in contrast to conventional over-center devices that must be pushed through the locked over-center to allow the parts to fold. The consequence in these embodiments described herein is an easy to set and very sensitive trigger that is stable until tripped.

The elevation of catch 134 above spreader arm 114 controls the amount of upward pressure spreader arm 114 can exert on catch 134. If catch 134 is adjusted to hold spreader arm 114 barely above center, the upward pressure on catch 134 will be minimal. The higher away from center that catch 134 holds spreader arm 114, the increased leverage will magnify the upward pressure applied to catch 134. Moving the location of shim 137 along 114 toward the pivot point of the arm will increase the elevation that spreader arm 114 is held above center. Holding its location and thickening shim 137 or increasing the height of catch 134 can achieve the same result. The greater the upward pressures applied to catch 134 are, the more difficult it will be for the trigger to push catch 134 off of spreader arm 114.

In summary, shim 137 keeps spreader arm 114 from going past center, and catch 134 determines how high above center spreader arm 114 is held. In practice, shim 137 is fine-tuned or changed so that spreader arm 114 will be just prevented from going past center. Then catch 134 is sized to hold spreader arm 114 in that position. This minimizes the upward pressure on catch 134. An adjusting screw on the spreader arm 114 could be used to do the fine-tuning otherwise effectuated by shim 137. Therefore, a shim or an adjusting screw can be placed on a spreader arm to adjust the sensitivity of the trigger.

In FIG. 1B it can be seen that the spreader mechanism parts 114 and 116 have folded-up and wire arms 102, 104, and half-noose jaws 106, 108 have crossed one another. This crossing of the arms may not be desirable in some applications and they can tangle and interfere with each other when the trap 100 is being set for use. Various alternative constructions may be used to control this, including shaping pivot coupler 308 (FIGS. 3A and 3B) and spacer 410 (FIGS. 4A and 4B) in a way that prevents the closing arms from crossing. Other strategies include bending the half-nooses 106 and 108 in such a way they will catch each other, and varying the length of arms 102 and 104 so that they can cross without the interference.

In one embodiment of the present invention, the spring 110, arms 102 and 104, and the half-nooses 106 and 108 can be fabricated from a single continuous piece of spring steel wire. In other embodiments, these pieces could each be separately made and then assembled together. For example, a coiled wire spring could be stretched between the arms, FIGS. 2A and 2B represent a toggle trip mechanism, or preferably a spring spreader mechanism 200. They illustrate how the spring spreader mechanism 200 operates in an embodiment of the present invention. Spring spreader mechanism 200 has two unequal length folding pieces 202 and 204 which are joined on a pivot 206 well off center. Such arrangement provides some leverage to help the user set the trap and it reduces the forces needed to keep the trigger set.

Such pivot 206 can comprise a loose rivet or simple machine screw held on with a nut. The center of pivot 206 is represented in the drawings by a crosshair. Folding piece 202 is provided with a round or oval hole 210 with which to mount on a first wire spring arm and to allow it to pivot. Similarly, folding piece 204 is provided with an identical round or oval hole 212 with which to mount on a second wire spring arm and to allow that part to pivot as well. If holes 210 and 212 are oval, the short diameter would be about the same as the diameter chosen for the jaw wire, the long diameter is elongated enough so the parts can slide around the bends in the jaw as they are slipped on. Oval holes might be better able to keep everything in alignment, particularly if the trap is made to relatively high tolerances.

The two folding pieces 202 and 204 can pivot on holes 210 and 212 and their respective wire spring arms to fold up like shown in FIG. 2B. The height "h" to which folding piece 202 rises is important because that dimension is limited by the diameter of the gopher hole in which the trap is deployed. The geometry must therefore be adjusted to accommodate these limitations.

The "under-center" mechanism in embodiments of the present invention can be implemented as shown in FIGS. 2A and 2B. A centerline 213 has been drawn through the centers of holes 210 and 212. Notice that in FIG. 2A that when the spreader mechanism 200 is fully extended, the center of pivot 206 is still above centerline 213, it never crosses over. It gets very close, but never is allowed to go "over-center". This then requires a catch 214 connected to a trigger to provide the tiny force necessary to stop the spring pressure from folding the spreader mechanism 200 like in FIG. 2B. A shim, such as 137 in FIG. 1B, can be applied to help adjust the closed elevation of the center of pivot 206 above centerline 213. This shimming would also have an affect on the force needed to trigger a release of catch 214. A screw adjustment would also be possible.

Referring now to FIG. 2C, a lot of pressure is exerted on the folding spreader mechanism pieces 202 and 204 when spreading the arms (102 and 104 in FIG. 1). If the folding spreader mechanism 200 is not kept in proper alignment with the spring forces at work, the spreader mechanism 200 can bind on pivot holes 210 and 212 and not operate smoothly when the trap is tripped. Such binding introduces unwanted friction that can prevent the quick release of the arms when the trap is tripped. So, it is important that the spreader mechanism stays on the arms straight.

FIG. 2C illustrates how folding spreader mechanism piece 202 can be fabricated from a U-channel to include yoke pivots 216 and 218. Together these constitute pivot hole 210 as seen in FIGS. 2A and 2B. Such an arrangement of yoke pivots 216 and 218 is used to keep the whole spreader mechanism 200 from wobbling excessively on an arm 220 (e.g., arms 102 and 104 in FIG. 1) that it mounts on. Just to be clear, arm 220 does not pass through folding spreader mechanism piece 204, instead it is attached to piece 202 and rotates on pivot 206.

Depending on the fabrication and assembly methods used, for example in FIG. 1, for the spring 110, arms 102 and 104, and the half-nooses 106 and 108, it may not be possible to use the construction illustrated in FIGS. 2A-2C for folding spreader mechanism pieces 202 and 204. The various kinks and bends in the wire material can prevent the spreader mechanism 200 from begin installed easily. FIGS. 3A, 3B, 4A, and 4B, represent alternative ways that a folding spreader mechanism can be constructed that includes yoke type pivots to prevent wobbling.

FIGS. 3A and 3B show a folding spreader mechanism 300 that stabilizes a middle pivot 302 between two folding spreader mechanism pieces 304 and 306. On one side, folding spreader mechanism 300 mounts with a pivot coupler 308 to a spring arm 310 and can rotate on an outside pivot 312 as the trap is set and released. The pivot coupler 308 is fixed to folding spreader mechanism piece 304 with forming, welding, or fasteners 314. A bridging cap 316 provides a second stabilizing point in a yoke arrangement for middle pivot 302. It too is fixed to pivot coupler 308 with forming, welding, or fasteners 314.

Pivot coupler 308 is sized to act as a spacer between folding spreader mechanism piece 304 and bridging cap 316 such that a scissors action is permitted between them by piece 306 on middle pivot 302.

FIGS. 4A and 4B show a folding spreader mechanism 400 that stabilizes two pivots with a yoke arrangement for each. A middle pivot 402 joins two folding spreader mechanism pieces 404 and 406 and allows a scissors action between them. A bridging coupler 408 and folding spreader mechanism piece 404 are spaced apart by a spacer 410 and rotate together as an outside pivot 412A and 412B on a spring arm 414 as the trap is set and released. The bridging coupler 408 is fixed to spacer 410 and folding spreader mechanism piece 404 with forming, welding, or fasteners 416. The bridging coupler 408 provides a second stabilizing point in a yoke arrangement for both middle pivot 402 and outside pivot 412A and 412B.

FIG. 5A represents a trap 500 and spreader mechanism 502 like that used in FIGS. 1A and 1B, and is shown in the folded, or trap-sprung position. A tool 504, such as a screwdriver or an Allen wrench, is shown inserted into a slot 506. This can provide the user with the extra leverage that they may need to comfortably set the trap as shown in FIG. 5B. Slot 506 is placed at the distal end of a lever 508 for maximum advantage. Another lever 510 connects to lever 508 with a rivet or screw 512 and these constitute the under-center assembly described herein.

FIG. 5B shows the trap 500 and spreader mechanism 502 of FIG. 5A, in the extended, or trap-armed position using tool 504 to make it easier. Once the trap is set, tool 504 is removed.

FIGS. 6A and 6B represent alternative ways that a folding spreader mechanism can be constructed. Commercially successful embodiments of the present invention make the trigger soft, dependable and repeatable.

In the prototypes that were tested, keeping the forces on the spreader mechanism properly aligned had been a recurring hurdle. Even minor misalignments invited unwanted friction. The initiating trigger-release pressure from the rodent is often very weak, e.g., a sniff of the nose. Such a faint force is easily contradicted by any increases in friction in the pivot that prevents the jaws from closing when the trap is triggered. Evenly distributing the spring forces helps keep the folding spreader mechanism aligned.

One challenge in constructing practical embodiments is how to hold the folding spreader mechanism in its proper place on the spring. Any or all of the components, other than the spring, might be made from injection molded plastic or other heavy duty materials.

FIGS. 6A, 6B, and 6C, represent a folding spreader mechanism 600 that maintains its alignment better and helps keep the trigger sensitive and repeatable. A first spreader arm 602 is joined to a second spreader arm 604 by a folding pivot pin 606. A pivot hole 608 is provided in second spreader arm 604 to immobilize and hold folding pivot pin 606. Such immobilization can be accomplished by press-fitting or machine threading folding pivot pin 606 into pivot hole 608. The folding pivot pin 606 may be threaded or smooth for its entire length.

The folding pivot pin 606 includes three sections, an inner section 610 flanked by a pair of outer sections 612 and 614. The inner section 610 is what contacts and fixes to pivot hole 608 after assembly, as represented in FIG. 6B. The outer sections 612 and 614 are relatively sized so they can freely rotate inside pivot holes 616 and 618 in the first spreader arm 602 without any wobbling.

If pivot pin 606 is threaded, pivot hole 608 is also threaded. During assembly, as represented in FIG. 6A, pivot pin 606 is passed through either of pivot holes 616 and 618 and screwed in.

If pivot pin 606 is smooth, the inside of pivot hole 608 is smooth and slightly undersized. During assembly, pivot pin 606 is pressure-fit from one side through the slightly undersized hole 608 for it in spreader mechanism piece 604, locking the pieces together. Joining pivot pin 606 to second spreader arm 604 creates a "T" which can freely rotate inside pivot holes 616 and 618 and not rub on the adjacent sides of first spreader arm 602.

Outboard pivot holes 622, 624, and 626 provide for spring arms, such as spring arms 310 in FIGS. 3A and 414 in FIG. 4A. A hole 628 is provided for a trigger arm wire shaft, such as trigger arm 128 in FIGS. 1A and 1B.

The construction described for folding spreader mechanism 600 would provide benefits if used in folding spreader mechanisms 200, 300 and 400, and traps 100 and 500.

FIGS. 7A-7D represent a spreader arm and trigger guide 700 integrated together into a single molded plastic part. The spreader arm and trigger guide 700 provides guidance and support of the trigger arm comparable to that shown in FIGS. 1A, 1B, 2A, 2B, 5A, 5B. Instead of having a short piece of tubing force fit into the spreader arm, such as 131 into 116 in FIG. 1B, spreader arm and trigger guide 700 forms a tube in two plastic parts to accomplish the same thing. A spreader arm piece 701 has a trigger arm base tray 702 extending toward the forward business end of trap 100, for example. A trigger arm shaft, like that of trigger arm 128 in FIGS. 1A and 1B, is laid down in a half-round channel 704 such that a round, wire-type trigger arm shaft can slide forward and back. A plastic snap-on retaining cap 706 with a matching half-round channel 708 clips on after the trigger arm has been inserted. A vertical up-bend portion of the trigger arm (as seen in FIGS. 1A and 1B) is positioned on the backside of spreader arm piece 701 between a pair of parallel vertical paddle guides 710 and 712 such the trigger arm cannot twist or turn away from its proper orientation during use.

The snap-on retaining cap 706 has opposite side skirts 714 and 716 that fit over the side edges of the trigger arm base tray 702. A pair of squared ridges 718 and 720 in the inside faces of the side skirts 714 and 716 catch and hold onto a pair of retaining grooves 722 and 724 in the bottom outside corners of trigger arm base tray 702.

In FIG. 1B the trigger is formed with front trigger guide 131 already attached. The large radius in hook 134 at the end of the trigger allows the hook to be slipped through the hole provided for it in spreader mechanism part 116. Front trigger guide 131 is then pressure fit into spreader mechanism part 116 with the trigger already inserted. Alternatively, front trigger guide 131 could be pressure fit into spreader mechanism part 116. With one end of the trigger, either hoop 130 or hook 134, already formed, arm 128 can be inserted through the combined 131/116, and the other end of the trigger formed to complete the assembly. However, the trigger (made up of 130, 128 and 134) cannot be inserted through front trigger guide 131 and spreader mechanism part 116 after the trigger is formed by bending.

In comparison, FIG. 7D shows how the trigger (130, 128, and 134 in FIG. 1B) can be independently formed beforehand and the component parts assembled together after forming. Hook 134 in FIG. 1B can be slipped through a hole 730 in spreader arm 701. The radius of the hook allows that. Hole 730 is sized so that the hook of the trigger can be looped through. Then the trigger guide is completed by snapping retaining cap 706 onto trigger arm base tray 702.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. An improved trap (100), comprising:
a pair of elongated rods in the form of arms (102, 104) biased to close together at their distal ends by a spring (110);
a pair of jaws (106, 108) for capturing a rodent attached to said distal ends of the elongated rods (102, 104);
a toggle trip mechanism (600) for spreading the pair of elongated rods (102, 104) apart to a set position and for releasing them to close when triggered;
a trigger (128) connected to the toggle trip mechanism (600);
the improvement comprising:
the toggle trip mechanism including an under-center device (600) connected to spread the pair of elongated rods (102, 104) and jaws (106, 108) apart against pressure from said spring (110) to a set position without itself locking into a stable over-center position;
the under-center device (600) includes a folding spreader mechanism (600) having a first spreader arm (602) pivotally engaged to one of said elongated arms (102), a second spreader arm (604) pivotally engaged to the other elongated arm (104) with a pivot (606) fixed at its inner section to said second arm (604), and the pivot (606) has flanking outer sections (612, 614) that are free to rotate within matching holes in said first spreader arm (602) wherein in said set position an of the pivot (606) is above a centerline extending through a center of said elongated arms (102, 104) and a path of travel of said axis from said set position to said close does not cross said centerline;
a trigger catch (134) connected to the under-center device (600) to provide a sufficient restriction of the toggle trip mechanism until a touch on the trigger (128) causes the catch (134) to move and release the under-center device from said set position; and
wherein no part of the trap occupies any space between the pair of elongated rods in front of the trigger when the toggle trip mechanism is in said set position.

2. A trap, comprising:
a spring (110) connected to two outstretched arms (102, 104) and such that distal end of the arms (102, 104) are normally closed together;
a pair of open half-nooses (106, 108) each of which is perpendicularly attached to said distal ends of the outstretched arms (102, 104), shaped to engage a rodent and such that the open-half nooses remain parallel to one another as the outstretched arms (102, 104) are forced apart and released to close together;
a folding spreader mechanism (600) having a first spreader arm (602) and a second spreader arm (604) joined to a common pivot (606), the folding spreader mechanism (600) positioned between said two outstretched arms (102, 104) with said first spreader arm (602) engaged to a base of one of said two outstretched arms (102, 104) and said second spreader arm (604) engaged to a base of the other of said outstretched arms (102, 104) and providing for a mechanism to force said outstretched arms (102, 104) open and apart in a set position under opposing pressure from the spring (110);

said pivot (606) disposed in the folding spreader mechanism (600) to allow the spreader mechanism (600) to fold to a closed position when said first spreader arm (602) is fully set on said second spreader arm (604) with an axis of said pivot (606) above a centerline extending through centers of said two outstretched arms (102, 104) thereby providing an under-center mechanism to prevent the folding spreader mechanism (600) from locking said outstretched arms (102, 104) in said set position wherein the path of travel of said axis from said set position to said normally closed position does not cross said centerline; and a trigger (128) attached to the folding spreader mechanism (600) such that a touch on the trigger (128) causes a release of the under-center mechanism from said set position and allows the folding spreader mechanism (600) to fold to said closed position and allowing said outstretched arms (102, 104) to close and;

wherein, no part of the trap occupies any space between the two outstretched arms (102, 104) in front of the trigger (128) when the folding spreader mechanism (600) is folded to said set position.

3. The trap of claim 2, wherein:

the folding spreader mechanism (600) includes said first spreader arm (602) pivotally engaged to said one of said outstretched arms (102), said second spreader arm (604) pivotally engaged to said other outstretched arm (104) with the pivot (606) fixed at its inner section to said second spreader arm (604), and said pivot (606) has flanking outer sections (612, 614) that are free to rotate within matching holes in said second spreader arm (602).

4. The trap of claim 3, wherein:

the spring (110), elongated rods (102, 104) and said open half-nooses (106, 108) are fabricated from a single piece of spring steel wire.

5. The trap of claim 2, wherein:

the folding spreader mechanism (600) includes a first pivot hole (618) within and intermediate ends of said first spreader arm (602), a second pivot hole (608) within and intermediate ends of said second spreader arm (604), a pivot pin (606) extending and rotatable within said first pivot hole (618) and secured within second pivot hole (608);

whereby the first spreader arm (602) rotates about said pivot pin (606) as said first spreader arm (602) folds over said second spreader arm (604) to fold to said set position.

6. The trap of claim 5, further comprising:

an adjustment (137) engaged to said first spreader arm (602) to limit a down stroke of said first spreader arm (602) when folded with said second spreader arm (604) to adjust a distance between said axis of said pivot (606) and said centerline and fine tune a sensitivity of the trigger (128).

7. The trap of claim 2, further comprising:

an adjustment (136) on said folding spreader mechanism (600) to engage the trigger (128) to fine-tune a sensitivity of the trigger (128).

8. The trap of claim 2, further including:

a catch (134) engaged to said second spreader arm (604) to hold said second spreader arm (604) in said set position with said axis of said pivot (606) above said centerline.

9. The trap of claim 8, further including:

an adjustment (136) engaged to said second spreader arm (604) and the catch (134) to adjust a distance between said axis of said pivot (606) above said centerline to fine tune a sensitivity of the trigger (128).

10. A rodent trap, comprising:

a spring (110) connected to two outstretched arms (102, 104) and such that distal ends of the arms (102, 104) are normally closed together;

a pair of open half-nooses (106, 108) each of which is perpendicularly attached to said distal ends of the outstretched arms (102, 104), shaped to engage a rodent and such that the open-half-nooses remain parallel to one another as the outstretched arms (102, 104) are forced apart and released to close together against and trap a rodent;

a folding spreader mechanism (600) having a first spreader arm (602) and a second spreader arm (604) joined to a common pivot (606), the folding spreader mechanism (600) positioned between said two outstretched arms (102, 104) with said first spreader arm (602) engaged to a base of one of said two outstretched arms (102, 104) and said second spreader arm (604) engaged to a base of the other of said outstretched arms (102, 104) and providing for a mechanism to force said outstretched arms (102, 104) open and apart in a set position under opposing pressure from the spring (110), said pivot (606) disposed in the folding spreader mechanism (600) to allow the spreader mechanism (600) to fold to a closed position when said first spreader arm (602) is fully closed on said second spreader arm (604) with an axis of said pivot (606) a distance slightly above a centerline extending through centers of said two outstretched arms (102, 104) whereby a path of travel of said axis from said set position to said normally closed does not cross said centerline thereby providing an under-center mechanism to prevent the folding spreader mechanism (600) from locking said outstretched arms (102, 104) in said set position;

a catch (134) frictionally engaging said first spreader arm (602) to prevent said first and second spreader arms (602, 604) from folding when the folding spreader mechanism (600) is in said set position;

a trigger (128) attached to the folding spreader mechanism (600) at the catch (134) such that a touch on the trigger (128) causes the catch (134) to disengage from said first spreader arm (602) and release of the under-center mechanism from said set position and allows the folding spreader mechanism (600) to fold to a released position and allowing said outstretched arms (102, 104) to close; and wherein, no part of the trap occupies any space between the two outstretched arms (102, 104) in front of the trigger (128) when the folding spreader mechanism (600) is folded to said set position.

11. The rodent trap of claim 10, including:

an adjustment (137) intermediate said first and second spreader arms (602, 604) and positioned to maintain said axis of said pivot (606) a distance above said centerline when the folding spreader mechanism (600) is in said set position to fine tune a sensitivity of the trigger (128).

12. The rodent trap of claim 11, wherein:
the adjustment (137) adjusts said distance such that the greater said distance above said centerline the greater the force needed to disengage the catch (134).

13. The rodent trap of claim 10, wherein:
a length of said first and second spreader arms (602, 604) between said pivot axis (606) and their respective outstretched arms (102, 104) is unequal thereby providing leverage in folding the folding spreader mechanism (600) to said set position.

14. The rodent trap of claim 13, including:
an adjustment (137) intermediate said first and second spreader arms (602, 604) and positioned to maintain said axis of said pivot (606) a distance above said centerline when the folding spreader mechanism (600) is in said set position to fine tune a sensitivity of the trigger (128).

15. The rodent trap of claim 14, wherein:
the adjustment (137) adjusts said distance such that the greater said distance the greater the force needed to disengage the catch (134).

16. The rodent trap of claim 14, wherein:
the adjustment (137) adjust said distance such that said axis of said pivot (606) is above and near said centerline whereby the force of the spring (110) is applied almost entirely horizontally across said first and second spreader arms (602, 604) with minimal upward force against said catch (134) thereby enabling the catch (134) to be disengaged from said first spreader arm (604) in response to minimal force from said trigger (128).

* * * * *